US007682170B2

(12) United States Patent
Hori et al.

(10) Patent No.: US 7,682,170 B2
(45) Date of Patent: Mar. 23, 2010

(54) ELECTRONIC APPARATUS

(75) Inventors: Tetsuya Hori, Kawasaki (JP); Tomoyuki Nagamine, Kawasaki (JP); Shigeru Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 467 days.

(21) Appl. No.: 11/698,944

(22) Filed: Jan. 29, 2007

(65) Prior Publication Data

US 2008/0074858 A1    Mar. 27, 2008

(30) Foreign Application Priority Data

Sep. 22, 2006    (JP) .............................. 2006-257320

(51) Int. Cl.
*H01R 3/00* (2006.01)
*H64M 1/00* (2006.01)
(52) U.S. Cl. .................... 439/164; 455/575.3; 439/165; 361/679.28
(58) Field of Classification Search ................ 439/164, 439/165; 361/679.27, 679.28; 455/575.3; 379/433.13
See application file for complete search history.

(56) References Cited

U.S. PATENT DOCUMENTS

| 2,955,271 | A | * | 10/1960 | Dawkins ..................... 439/164 |
| 3,936,026 | A | * | 2/1976 | Hampel et al. ............ 248/349.1 |
| 5,007,849 | A | * | 4/1991 | Shinoda ...................... 439/165 |
| 5,363,089 | A | * | 11/1994 | Goldenberg ............... 340/7.63 |
| 5,844,543 | A |   | 12/1998 | Tamura et al. |
| 5,947,440 | A | * | 9/1999 | Cho ....................... 361/679.22 |
| 6,125,029 | A | * | 9/2000 | Sasaki et al. ........... 361/679.28 |
| 6,301,100 | B1 |  | 10/2001 | Iwata |
| 6,650,547 | B2 | * | 11/2003 | Hemmi et al. .............. 361/755 |
| 7,248,903 | B2 | * | 7/2007 | Yoda ....................... 455/575.1 |
| 2006/0201098 | A1 | * | 9/2006 | Jung ........................ 52/653.1 |

FOREIGN PATENT DOCUMENTS

| JP | 7-160364 A | 6/1995 |
| JP | 2000-10657 A | 1/2000 |
| JP | 2003-108300 A | 4/2003 |
| KR | 1020010027292 A | 4/2001 |
| KR | 1020020037886 A | 5/2002 |

OTHER PUBLICATIONS

Korean Office Action dated Sep. 26, 2008, issued in corresponding Korean Patent Application No. 10-2007-0009221.

* cited by examiner

*Primary Examiner*—Neil Abrams
(74) *Attorney, Agent, or Firm*—Westerman, Hattori, Daniels & Adrian, LLP

(57) ABSTRACT

The present invention relates to a cable wiring structure of an electronic apparatus that has such a movable unit as an opening/closing unit and a rotary unit. The cable wiring structure is provided to suppress the wearing of a cable to improve the durability of the cable, and to offer other advantages. The cable wiring structure applies to an electronic apparatus having movable units (hinge mechanism, rotation mechanism). The cable according to the structure has an extra length portion, which gives the cable a length necessary for the cable, for example, to pass through the movable units, and which is housed in a cable housing unit. The cable housing unit is formed on the electronic apparatus, where the cable housing unit arranges the extra length portion in a sinuous form and allows a shift in the extra length portion caused by a move of the movable unit.

10 Claims, 20 Drawing Sheets

ELECTRONIC APPARATUS

CROSS-REFERENCE TO RELATED APPLICATIONS

This application is based upon and claims the benefit of priority from the prior Japanese Patent Application No. 2006-257320, filed on Sep. 22, 2006, the entire contents of which are incorporated herein by reference.

BACKGROUND OF THE INVENTION

1. Field of the Invention

The present invention relates generally to a cable wiring structure of an electronic apparatus, in which structure a cable is arranged in wiring across a movable unit for opening/closing or rotation, etc., and more particularly, to a cable wiring structure, an electronic apparatus, a manufacturing method of the same, and a cable which are applicable to cable wiring across a movable unit of each of various electronic apparatuses, such as cellular phone terminal devices.

2. Description of the Related Art

Among various portable electronic apparatuses, such as cellular phone terminal devices and personal computers (PC) an apparatus having a plurality of cases connected via a hinge to be capable of rotation and opening/closing has been known. Such an apparatus offers improved portability, compactness, protection for a display unit, etc. Another type of apparatus has a display that can be rotated to provide higher visibility. Such a device having a movable unit needs a well-devised method of leading around and holding a cable.

Related to an electronic apparatus wired with a cable as described above, Japanese Patent Application laid-Open Publication No. 2003-108300 discloses a technique that a cable pulled out of an apparatus body is press fitted into an outer peripheral slot formed on the apparatus body (ABSTRACT, FIG. 4). Japanese Patent Application laid-Open Publication No. 2000-10657 discloses a technique that a slot housing a cable for connection to an external device is formed on the body of an electronic apparatus, of which the body and a lid can be opened/closed via a hinge mechanism (ABSTRACT, FIG. 1). Japanese Patent Application laid-Open Publication No. 1995-160364 discloses a structure including a body, an input display unit, and a connecting arm, in which structure the connecting arm can be rotated relative to the body via a first hinge mechanism and the input display unit can be rotated relative to the connecting arm via a second hinge mechanism (ABSTRACT, FIG. 8).

Besides a cable, an FPC (Flexible Printed Circuit) etc., is known as a wiring material. An electronic apparatus, such as a PC, is equipped in many cases with such a cable as a thin coaxial cable offering a shielding effect to enable transmission of a plurality of signals and/or data. In an apparatus having a movable unit, particularly, a cable showing a greater bearing capacity against torsion than an FPC is suitable for a wiring portion formed across the movable unit.

When a cable is arranged across a movable unit in an apparatus, a cable housing unit for housing the cable must be formed in the apparatus. Such a cable housing unit occupies a large space inside the apparatus.

When a cable is set in an elongated form to facilitate assembling of cases, the cable may happen to be caught in a joint between the cases upon assembling, and an extra length space for housing the cable increases the size of an apparatus, becoming the cause of prevention of miniaturization of the apparatus.

Japanese Patent Application laid-Open Publication Nos. 2003-108300, 2000-10657, and 1995-160364 provide no disclosure or suggestion concerning the above problems, and present no disclosure or hint on a configuration, etc., for solving the problem either.

SUMMARY OF THE INVENTION

An object of the present invention is to suppress the wear of a cable to improve the durability of the cable with regard to cable wiring on an electronic apparatus having such a movable unit as an opening/closing unit and a rotary unit.

Another object of the present invention is to improve a layout function of a cable incorporated into an electronic apparatus.

A still another object of the present invention is to improve the assembling performance of an electronic apparatus.

A still another object of the present invention is to contribute to the miniaturization of an electronic apparatus.

In order to achieve the above objects, according to the present invention, an extra length portion is formed on a cable that is arranged in wiring to be passed through movable units in various electronic apparatuses, such as a cellular phone terminal device, having one or two or more movable units of an opening/closing unit, rotary unit, etc. This extra length portion gives the cable interconnecting substrates an extra length on the intermediate part of the cable. The extra length portion protects the cable from mechanical load (stress) resulting from a manufacturing process, such as assembling of the apparatus, from the operated move of the movable units, etc., and improves a degree of freedom in manipulating members upon assembling the apparatus. The extra length portion is arranged sinuously in a cable housing unit arranged on the body of the electronic apparatus. This form of arrangement permits the extra length portion to shift as the movable unit moves. As a result, efficiency in storing the cable is improved, the electronic apparatus is miniaturized, and stress concentration due to the operated move of the movable unit is avoided, which prevents the wear of the cable, improves the durability of the cable, and prevents unevenness in the durability of products, thereby achieve the above objects.

In order to achieve the above objects, according to a first aspect of the present invention there is provided a cable wiring structure of an electronic apparatus having a movable unit, comprising an extra length portion formed on a cable passed through the movable unit; and a cable housing unit that is formed on the electronic apparatus to arrange and house the extra length portion of a sinuous form, and that allows a shift in the extra length portion caused by a move of the movable unit.

Preferably, the movable unit is a hinge mechanism that opens/closes the electronic apparatus, the hinge mechanism having a through portion though which the cable is passed.

Preferably, the movable unit is a rotation mechanism that rotates a frame of the electronic apparatus, the rotation mechanism having a through portion though which the cable is passed.

Preferably, the cable housing unit has either or both of bent guide portions, one guide portion bending the extra length portion at 90 degrees or less, and the other guide portion bending the extra length portion at 90 degrees or more into an arc.

Preferably, a part or the whole of the extra length portion of the cable is sheathed with a protective sheathing.

Preferably, the cable housing unit has an expanding portion that allows the cable to shift widthwise.

Preferably, the cable housing unit has a holding portion that prevents the cable from shifting longitudinally.

Preferably, the cable housing unit comprises a bearing portion that bears the cable placed thereon; and standing walls that restrict the extra length portion placed on the bearing portion to arrange the extra length portion sinuously.

Preferably, the protective sheathing is a resin belt wound spirally.

Preferably, the extra length portion of the cable has a part exposed from the protective sheathing, the exposed part being a part passing through the movable unit or being near the part passing through the movable unit.

In order to achieve the above objects, according to a second aspect of the present invention there is provided a cable wiring structure of an electronic apparatus having first and second movable units and a plurality of substrates, the structure comprising a cable that is passed through the first and second movable units and is connected to the substrates; an extra length portion formed on the cable; and a cable housing unit that is formed on the electronic apparatus to arrange the extra length portion in a sinuous form, and that allows a shift of the extra length portion caused by operation of moving the first or second movable unit.

In order to achieve the above objects, according to a third aspect of the present invention there is provided an electronic apparatus having a movable unit, comprising a cable housing unit that guides an extra length portion to the movable unit, the extra length portion being formed on a cable passed through the movable unit.

Preferably, the electronic apparatus comprises a movable arm that supports a movable side case movably via the movable unit, the movable arm having the cable housing unit. Preferably, the movable unit is a hinge mechanism that opens/closes a frame, the hinge mechanism having a through portion through which the cable is passed. Preferably, the movable unit is a rotation mechanism that rotates a frame, the rotation mechanism having a through portion through which the cable is passed. Preferably, the cable housing unit has either or both of bent guide portions, one guide portion bending the extra length portion at 90 degrees or less, and the other guide portion bending the extra length portion at 90 degrees or more into an arc. Preferably, a part or the whole of the extra length portion of the cable is sheathed with a protective sheathing. Preferably, the cable housing unit has an expanding portion that allows the cable to shift widthwise. Preferably, the cable housing unit has a holding portion that prevents the cable from shifting longitudinally. Preferably, the cable housing unit comprises a bearing portion that bears the cable placed thereon; and standing walls that restrict the extra length portion placed on the bearing portion to arrange the extra length portion sinuously.

Preferably, the protective sheathing is a resin belt wound spirally. Preferably, the extra length portion of the cable has a part exposed from the protective sheathing, the exposed part being a part passing through the movable unit or being near the part passing through the movable unit.

In order to achieve the above objects, according to a fourth aspect of the present invention there is provided an electronic apparatus having first and second movable units and a plurality of substrates, comprising a cable that is passed through the first and second movable units and is connected to the substrates; an extra length portion formed on the cable; and a cable housing unit that is formed on the electronic apparatus to arrange the extra length portion in a sinuous form, and that allows a shift of the extra length portion caused by operation of moving the first and second movable units.

In order to achieve the above objects, according to a fifth aspect of the present invention there is provided a manufacturing method for an electronic apparatus having a movable unit, comprising the step of forming an extra length portion on a cable passing through the movable unit and housing the extra length portion in a cable housing unit disposed on the electronic apparatus.

In order to achieve the above objects, according to a sixth aspect of the present invention there is provided a manufacturing method or a cable wiring method for an electronic apparatus having first and second movable units and a plurality of substrates, the method comprising the steps of passing a cable through the first and second movable units to connect the cable to the substrates; and arranging an extra length portion formed on the cable in a sinuous form.

In order to achieve the above objects, according to a seventh aspect of the present invention there is provided a cable arranged for wiring in an electronic apparatus having a movable unit, comprising an extra length portion on a part of cable that is placed on a frame of the electronic apparatus, the extra length portion being guided through a cable housing unit disposed on the electronic apparatus.

In order to achieve the above objects, according to an eighth aspect of the present invention there is provided a cable arranged for wiring in an electronic apparatus having first and second movable units and a plurality of substrates, wherein the cable is passed through the first and second movable units to be connected to the substrates and has an extra length portion, and wherein the extra length portion is arranged in a sinuous form along a cable housing unit formed on the electronic apparatus, and is allowed to shift in response to operation of moving the first or second movable unit.

Features and advantages of the present invention are listed as follows.

(1) The invention offers advantages with regard to an electronic apparatus, such as a cellular phone terminal device, that has such a movable unit as an opening/closing unit and a rotary unit, and to cable wiring on the electronic apparatus. The invention suppresses the wear of a cable due to operation for such a move as opening/closing and rotation to contribute to an improvement in the durability of the cable and to the suppression of unevenness of the durability of the cable.

(2) The invention provides various electronic apparatuses, such as cellular phone terminal devices, with an improved housing capacity for a cable.

(3) The invention contributes to an improvement in the assembling performance of various electronic apparatuses, such as cellular phone terminal devices.

(4) The invention contributes to the miniaturization of various electronic apparatuses, such as portable cellular terminal devices.

(5) The invention facilitates handling of a cable in such a manufacturing process as assembling of an electronic apparatus, contributing to an improvement in manufacturing efficiency.

BRIEF DESCRIPTION OF THE DRAWINGS

Other objects, features, and advantages of the present invention will be understood more clearly by referring to the embodiments and the accompanying drawings, in which.

DETAILED DESCRIPTION OF THE PREFERRED EMBODIMENTS

First Embodiment

Figure 1:
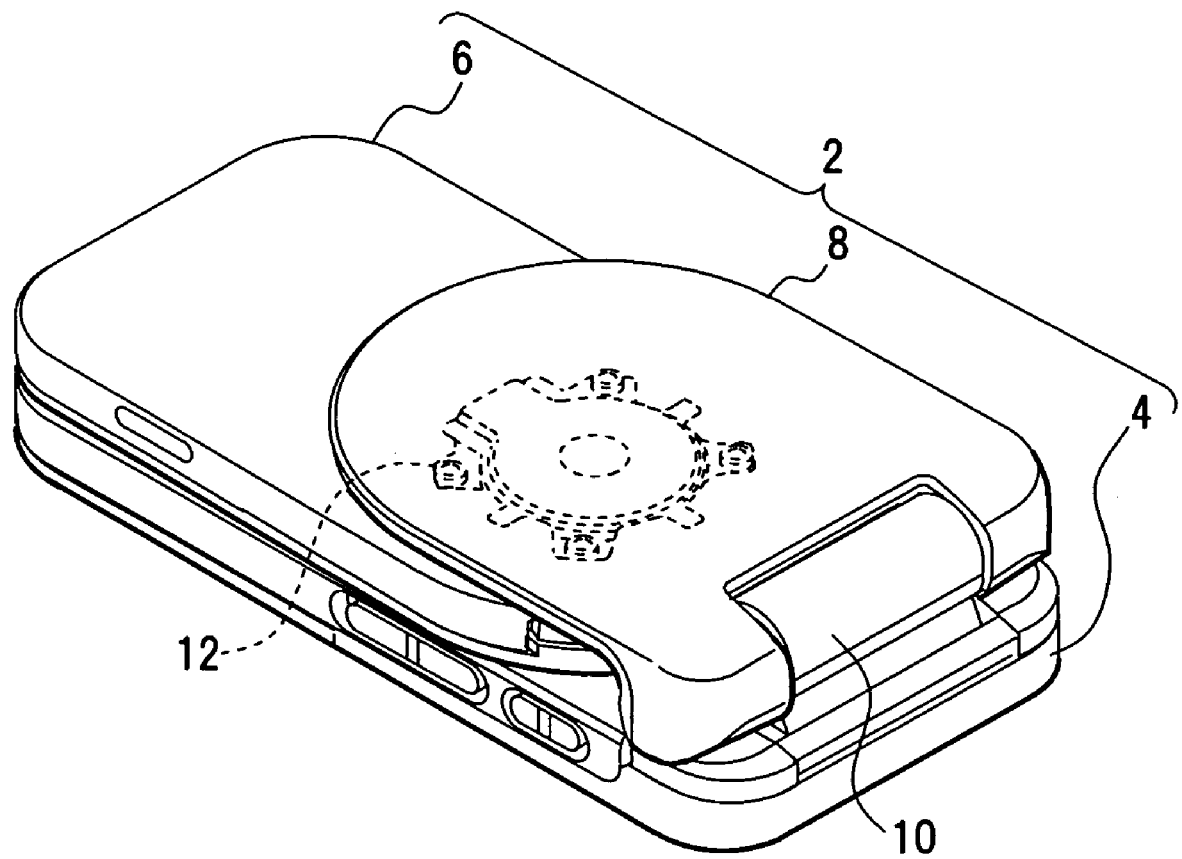
FIG. 1 is a general perspective view of a cellular phone terminal device according to a first embodiment.
Figure 2:
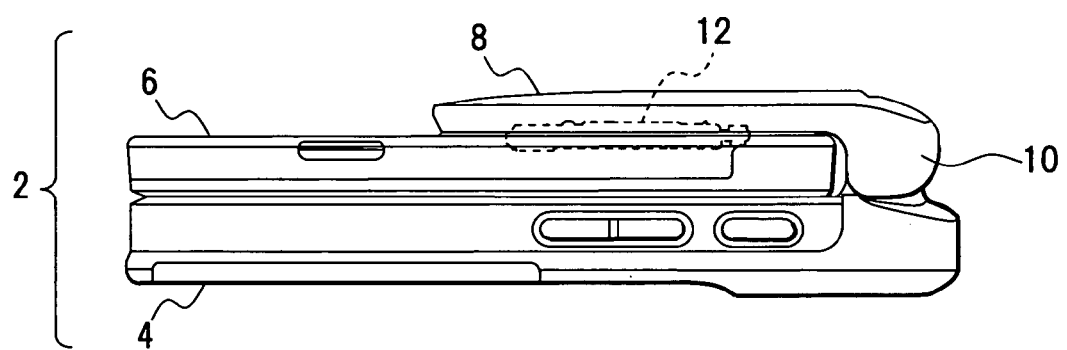
FIG. 2 is a side view of the cellular phone terminal device in a closed state.
Figure 3:
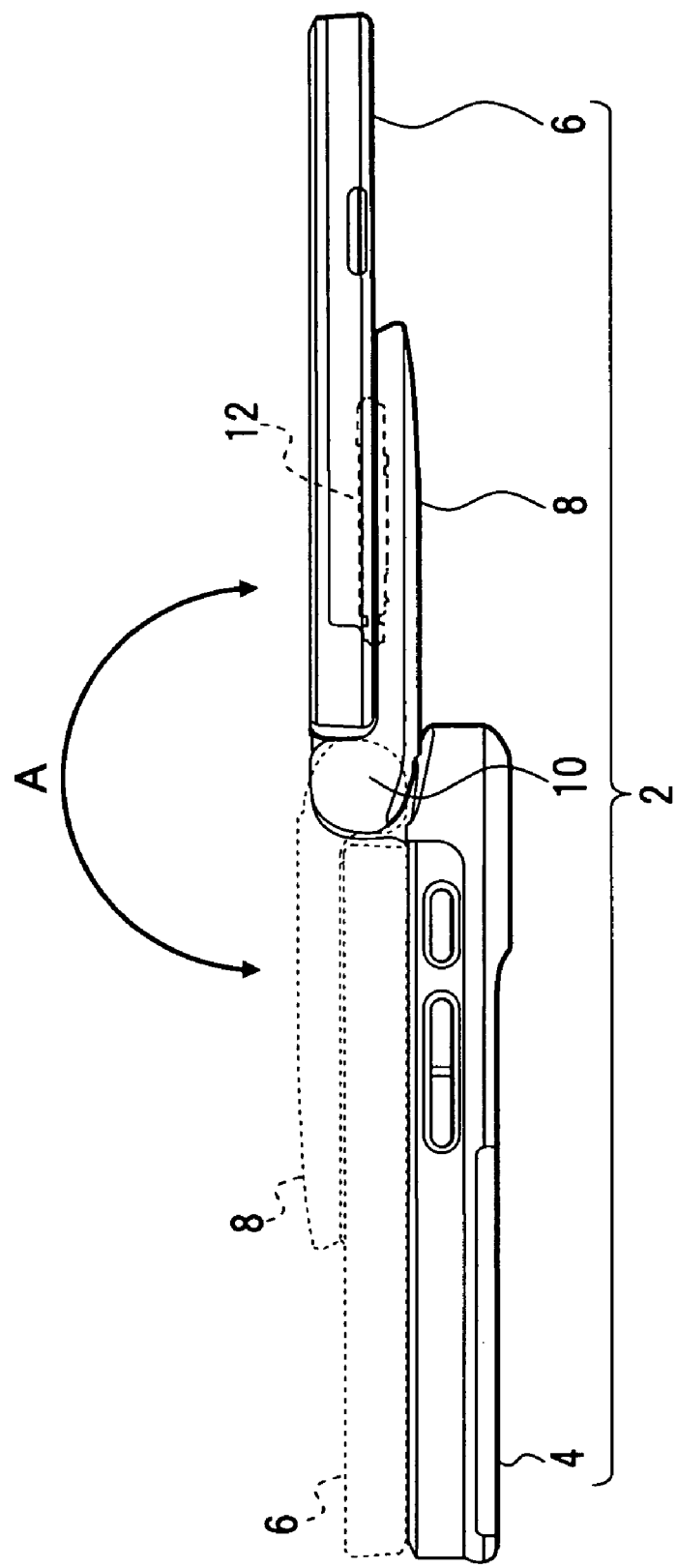
FIG. 3 is a side view of the cellular phone terminal device in an opened state.
Figure 4:
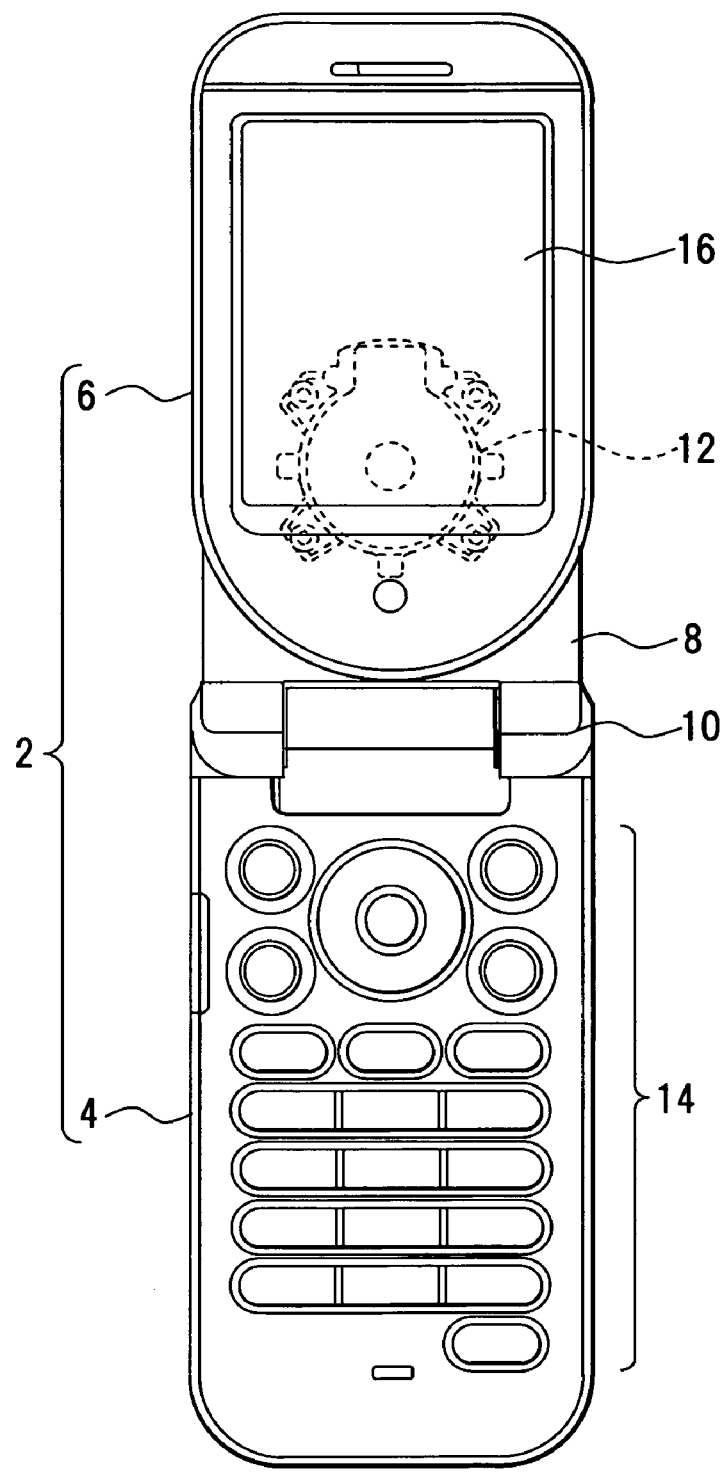
FIG. 4 is a front view of the cellular phone terminal device in the opened state.
Figure 5:
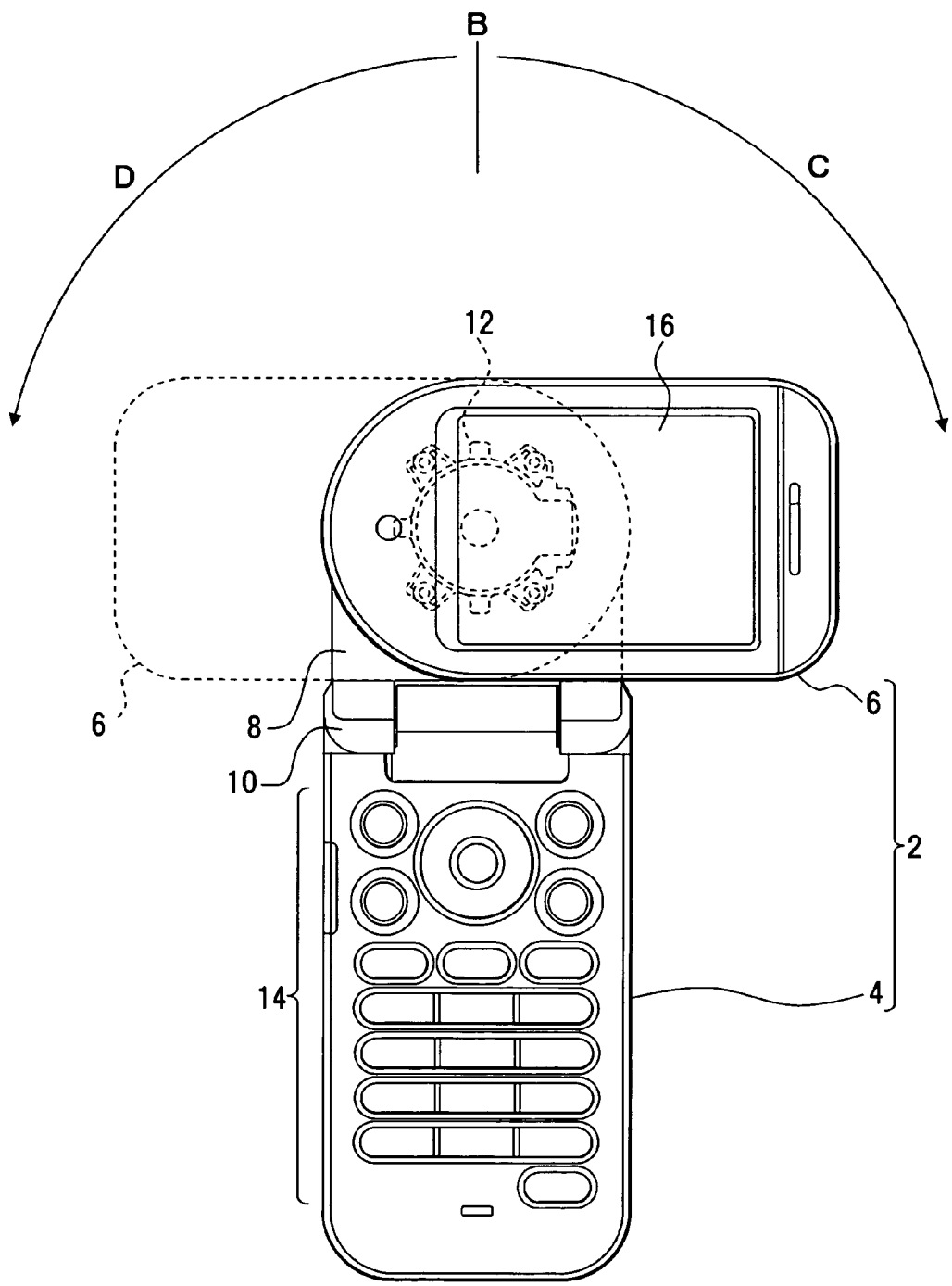
FIG. 5 depicts the rotation of a movable side case of the opened cellular phone terminal device to the right (to the left)
Figure 6:
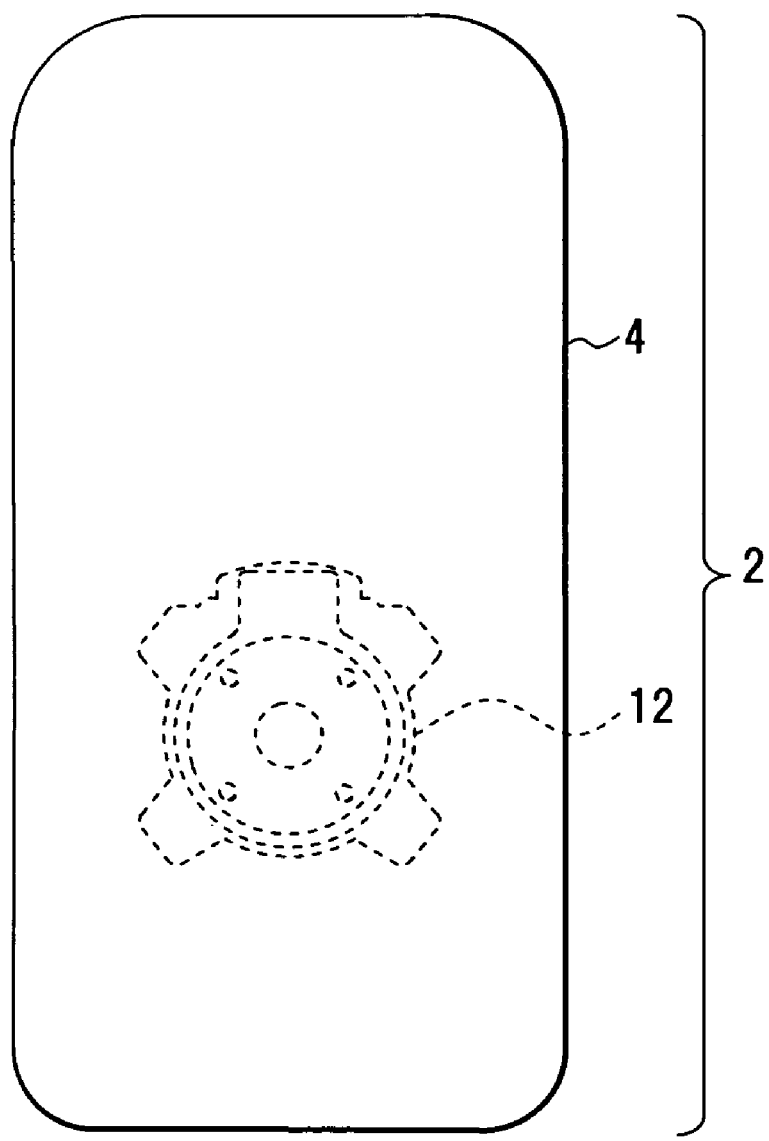
FIG. 6 is a rear view of the closed cellular phone terminal device.
Figure 7:
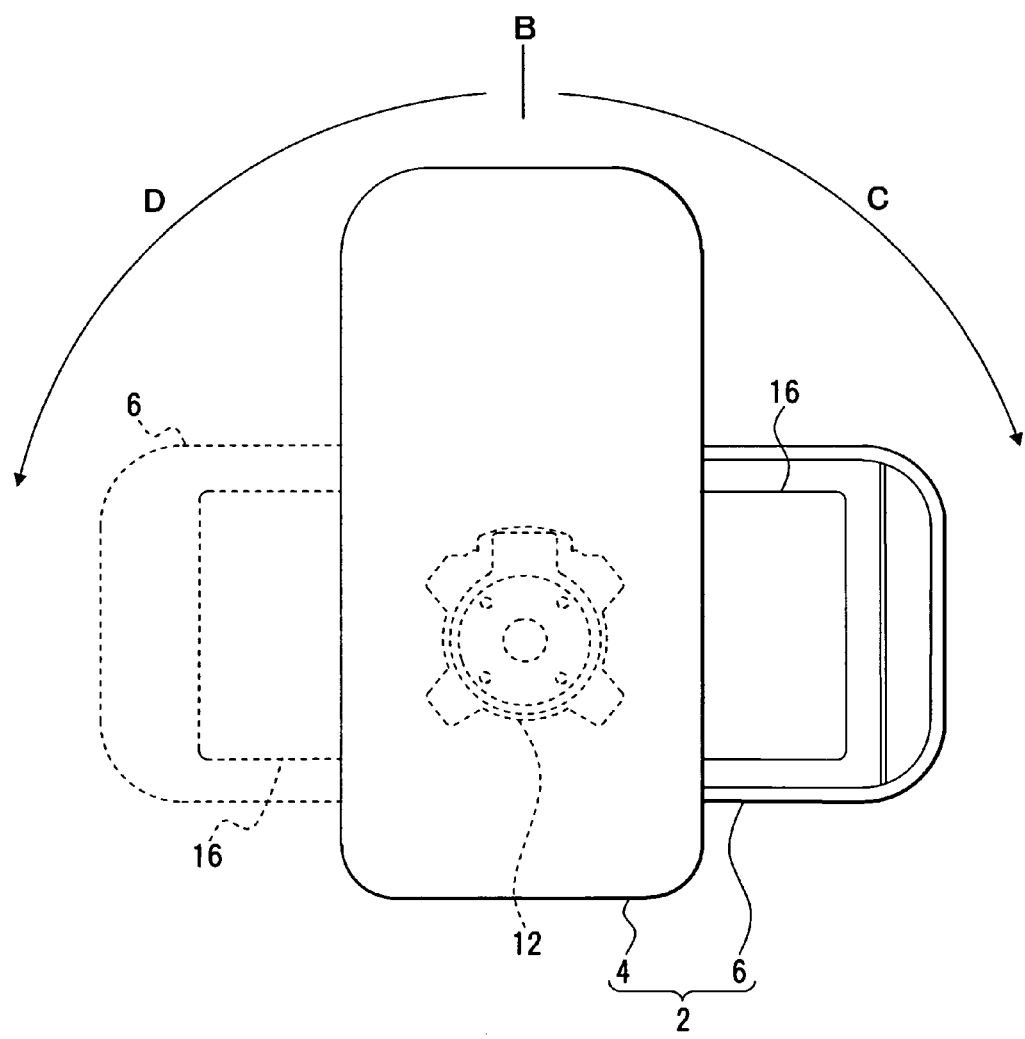
FIG. 7 depicts the rotation of the movable side case of the closed cellular phone terminal device to the right (to the left)

A first embodiment of the present invention will now be described with reference to FIGS. 1 to 7. FIG. 1 is a general perspective view of a cellular phone terminal device, FIG. 2 is a side view of the cellular phone terminal device in a closed state, FIG. 3 is a side view of the cellular phone terminal device in a opened state, FIG. 4 is a front view of the cellular phone terminal device in the opened state, FIG. 5 depicts the rotation of a movable side case of the opened cellular phone terminal device to the right (to the left), FIG. 6 is a rear view of the closed cellular phone terminal device, and FIG. 7 depicts the rotation of the movable side case of the closed cellular phone terminal device to the right (to the left).

The cellular phone terminal device 2 is an instance of an electronic apparatus having a plurality of movable units, such as an opening/closing unit and rotary unit. As shown in FIGS. 1 to 4, the cellular phone terminal device 2 includes a fixed side case 4, which is a first case, and the movable side case 6, which is a second case. A movable arm 8 is fitted to the fixed side case 4 via a hinge mechanism 10, which is an opening/closing unit (first movable unit). The movable side case 6 is fitted to the movable arm 8 via a rotation mechanism 12, which is a rotary unit (second movable unit). The rotation mechanism 12 is a means for causing the movable arm 8 to support the movable side case 6, which is a movable frame, in a rotatable manner. The movable arm 8 constitutes a frame on which a cable 18 (FIG. 8), which will be described later, is placed.

The fixed side case 4 includes an input operation unit 14 having a plurality of keys, such as character keys and a cursor key. The movable side case 6 has a display unit 16 composed of an LCD element (Liquid Crystal Display), etc.

According to the cellular phone terminal device 2 provided with the movable units of hinge mechanism 10 and rotation mechanism 12, the movable side case 6 can be opened/closed together with the movable arm 8 or rotated at a given angle. The movable side case 6 can be closed together with the movable arm 8 onto the fixed side case 4, as shown in FIGS. 1, 2, or opened/closed in the manner as shown by an arrow A in FIG. 3, or kept in an open position, as shown in FIG. 4. The movable arm 8 and movable side case 6 can be stopped and kept at a point of stoppage in the course of transition from the closed state to the opened state.

As shown in FIG. 5, the movable side case 6 in the opened state can be rotated relative to the fixed side case 4 in an arrowed direction C (to the right) or in an arrowed direction D (to the left) from a central position B to form an L shape. The movable side case 6 can be stopped and kept at a point of stoppage on the way to the end of rotation to the left/right.

Since the movable side case 6 is supported on the movable arm 8, the movable side case 6 in the closed state shown in FIG. 6 can also be rotated relative to the fixed side case 4 in the arrowed direction C (to the right) or in the arrowed direction D (to the left) from the central position B to form an L shape, as shown in FIG. 7, and can be stopped and kept at a point of stoppage on the way to the end of rotation to the left/right as well. Such rotation of the movable side case 6 enables visual recognition of the contents of display by the display unit 16 on the movable side case 6 from the back of the fixed side case 4.

Figure 8:
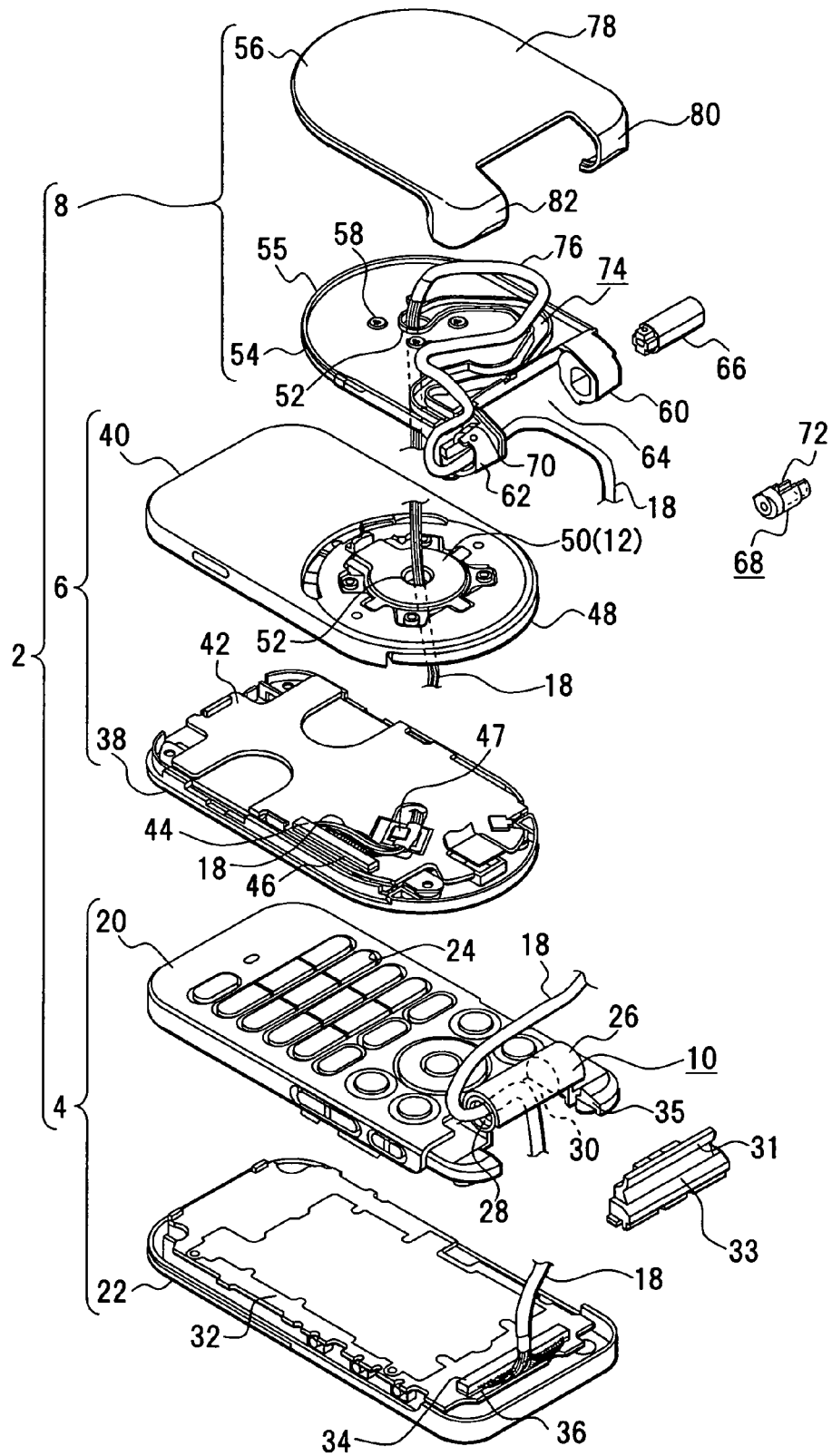
FIG. 8 is an exploded perspective view of an example of the structure of the cellular phone terminal device and a cable wiring structure.
Figure 9:
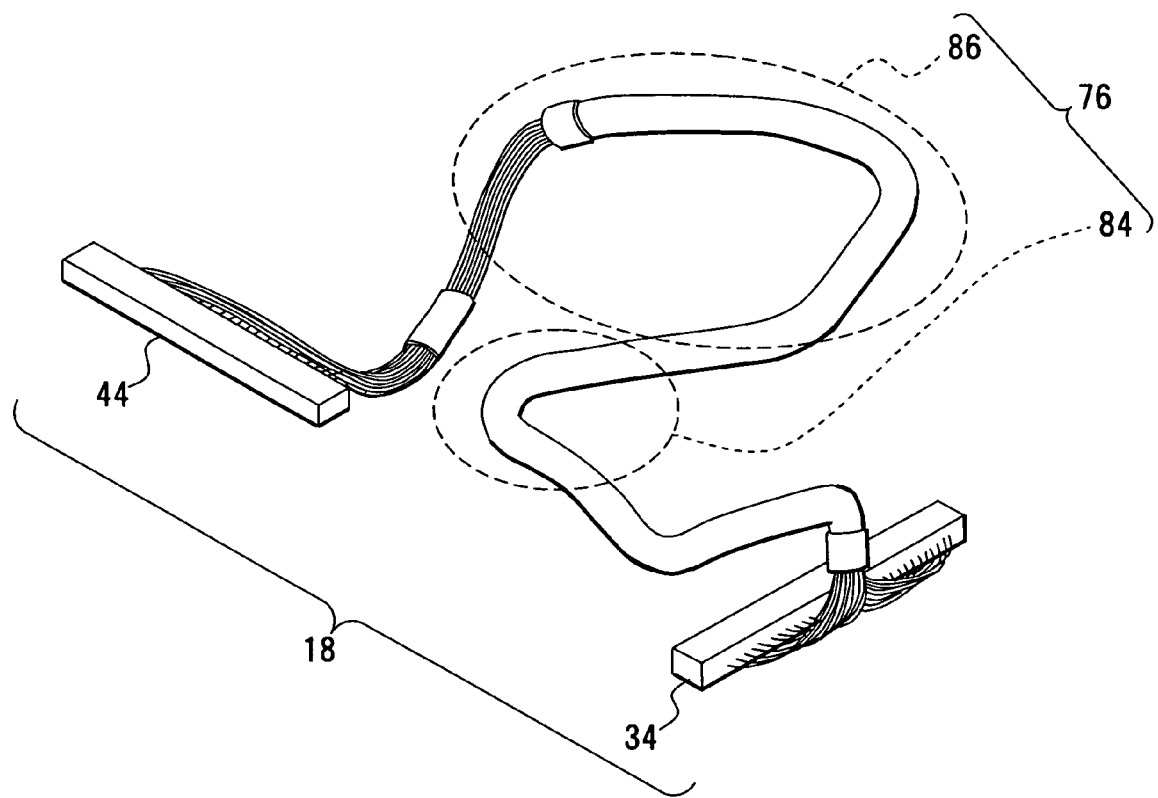
FIG. 9 is a perspective view of a wiring form of a cable.

The structure of the cellular phone terminal device 2 and a cable wiring structure will be described with reference to FIGS. 8, 9. FIG. 8 is an exploded perspective view of an example of the structure of the cellular phone terminal device 2 and the cable wiring structure, and FIG. 9 is a perspective view of a wiring form of a cable. In FIG. 8, the same components as described in FIGS. 1 to 7 are denoted by the same reference numerals.

The structure of the cellular phone terminal device 2 and the cable wiring structure give an example of a cable wiring structure of an electronic apparatus having a movable unit. According to this structure of the present embodiment, the cable 18 is arranged to penetrate the hinge mechanism 10 and the rotation mechanism 12, which are the movable units, to be subjected to a stress caused by opening/closing of the hinge mechanism 10 and the rotation of the rotation mechanism 12.

The fixed side case 4 includes a fixed side front case 20 and a fixed side rear case 22, as shown in FIG. 8. The fixed side front case 20 has key windows 24 of the input operation unit 14, and the bearing portion 26 of the hinge mechanism 10, which bearing portion 26 is so formed on the longitudinal edge of the front case 20 as to project out of the upper face of the front case 20. The bearing portion 26 has a through-hole 28, on the side face of the through-hole 28 a cable insertion portion 30 is formed, for example, as a cutout to allow the cable 18 to be inserted into the insertion portion 30. A bearing piece 31 is attached to the bearing portion 26, where the base 33 of the bearing piece 31 is fitted into a connecting recession 35 of the fixed side front case 20 to be fitted on the front case 20.

The fixed side rear case 22 carries a fixed side substrate 32, which is provided with a connector unit 36 that is connected to a connector 34 at one end of the cable 18. The connector unit 36 is disposed under the hinge mechanism 10 so that the wiring length of the cable 18 is reduced.

The movable side case 6 includes a movable side front case 38, and a movable side rear case 40. The movable side front case 38 carries a movable side substrate 42, in addition to the display unit 16 (FIG. 4). The movable side substrate 42 is provided with a connector unit 46 that is connected to a connector 44 at the other end of the cable 18. The connector unit 46 is disposed near the rotation mechanism 12 so that the wiring length of the cable 18 is reduced. The cable 18 is clipped by a clip 47 serving as a fixing unit attached to the vicinity of the connector unit 46, and is fixed to the movable side substrate 42. The clip 47 is provided to be capable of preventing the connector unit 46 from coming off even if the cable 18 is pulled upon assembling the cellular phone terminal device 2.

A rotary module 50 of the rotation mechanism 12 is fitted on a circular portion 48 of the movable side rear case 40. The rotary module 50 has a cable insertion hole 52, which is a through portion for allowing the cable 18 to pass through the hole 52. The cable 18 and the connector 44 are lead through the cable insertion hole 52 to the movable side substrate 42, where the connector 44 is connected to the connector unit 46. The fixed side substrate 32 is thus connected electrically to the movable side substrate 42 via the cable 18 that is passed through the bearing portion 26 of the hinge mechanism 10 and through the rotation module 50.

The movable arm 8 has an arm 54, and an arm cover 56. To a circular portion 55 of the arm 54, the above rotary module 50 and the movable side rear case 40 of the movable side case 6 are fixed with a fixing means of, for example, a plurality of screws 58. The circular portion 55 has the cable insertion hole 52 for inserting the cable 18 through the hole 52. Bearing portions 60, 62 of the hinge mechanism 10 are formed on the movable arm 8 to make a gap 64 between the bearing portions 60, 62, and the bearing portion 26 of the fixed side case 4 is inserted into the gap 64. Into the bearing portion 60, a hinge module 66 is inserted and fixed as a hinge shaft reaching the bearing portion 26 of the fixed side case 4. The bearing portion 62 serves to cause the cable 18 to pass through the bearing portion 62, is fitted with a cable guide 68, and has a cutout 70 for leading the cable 18 to the upper face of the arm 54.

The cable guide 68 is fitted to the bearing portion 62 to constitute the hinge shaft reaching the bearing portion 26. In addition, the cable guide 68 guides the cable 18 to put it through the cable guide 68, and constitutes a cover covering the through-hole 28 of the bearing portion 26. The cable guide 68 thus has a cutout 72, which leads the cable 18 coming in from the cable insertion portion 30 of the bearing portion 26 to the upper face of the arm 54.

A cable housing unit 74 is formed on the back face of the arm 54 of the movable arm 8 (at the side where the movable side rear case 40 is not fixed). The cable housing unit 74 serves as a passage that leads the cable 18 having passed through the hinge mechanism 10 to the rotation mechanism 12, and that leads the cable 18 further through the rotation mechanism 12 to the movable side case 6. The cable housing unit 74 also serves as a function unit that houses the intermediate part of the cable 18.

The arm cover 56 has a lid 78 that covers the upper face of the arm 54 of the movable arm 8, and coverings 80, 82 that cover bearing portions 60, 62. The lid 78 is joined to the arm 54 to protect the upper face of the arm 54, and the coverings 80, 82 cover the peripheral walls of the bearing portions 60, 62 to reinforce and protect the bearing portions 60, 62.

The hinge mechanism 10 is composed of the bearing portion 26 of the fixed side case 4, the bearing portions 60, 62 of the movable arm 8, the hinge module 66, and the cable guide 68, as described above. The hinge mechanism 10 supports the movable arm 8 on the fixed side case 4 to open and close against the fixed side case 4 (up to 180 degrees according to the present embodiment). The hinge mechanism 10 serves as a passage means for the cable 18 as well.

The rotation mechanism 12 is, as described above, composed of the rotary module 50, and so supports the movable side case 6 on the movable arm 8 that movable side case 6 can rotate (up to 90 degrees to the left/right according to the present embodiment). The rotation mechanism 12 serves as a passage means for the cable 18 as well.

The cable 18, as shown in FIG. 9, has the connector 34 at one end, the connector 44 at the other end, and an extra length portion 76 occupying an intermediate part of the cable 18. The extra length portion 76 has a length providing a necessary connection distance between the connector unit 36 of the fixed side substrate 32 and the connector unit 46 of the movable side substrate 42. This length includes a length required for assembling an electronic apparatus, e.g., the cellular phone terminal device 2, giving the cable 18 a length necessary for dispersing a stress caused by movement operation. The extra length portion 76, according to the present embodiment, has a bend 84 bent at 90 degrees or less, and a bend 86 bent at 90 degrees or more into an arc.

Figure 10:
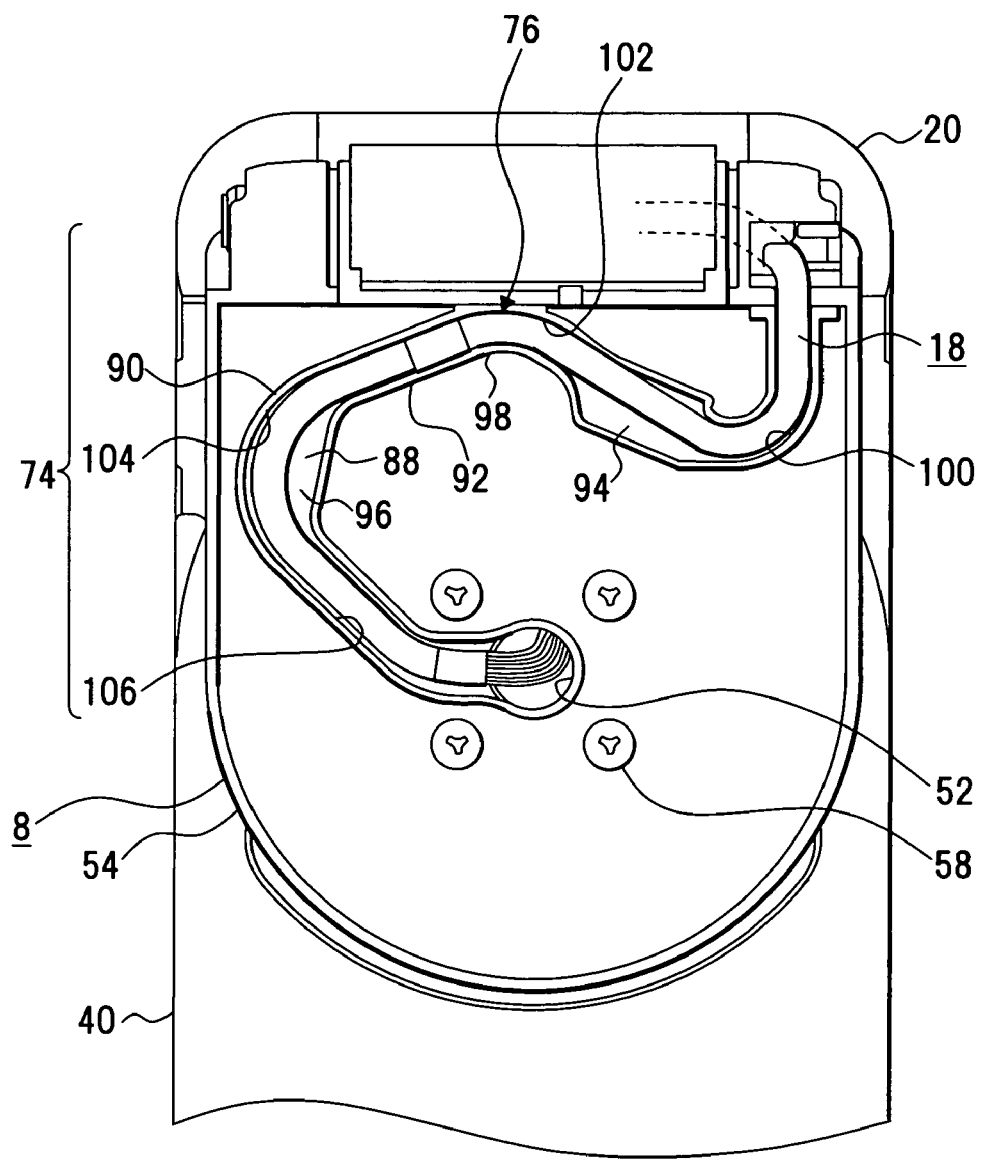
FIG. 10 is a top view of a cable housing structure on a movable arm.
Figure 11:
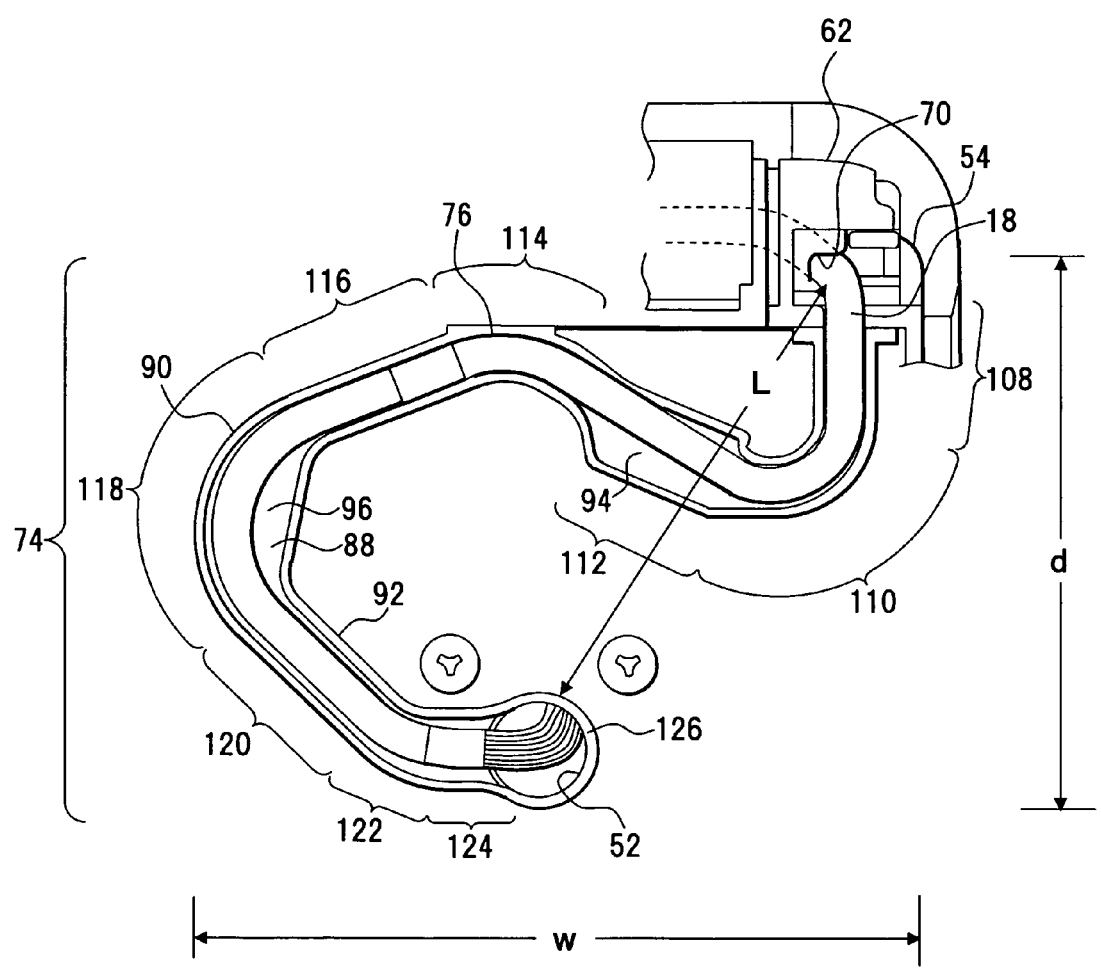
FIG. 11 depicts each part of an extracted cable housing unit.
Figure 12:
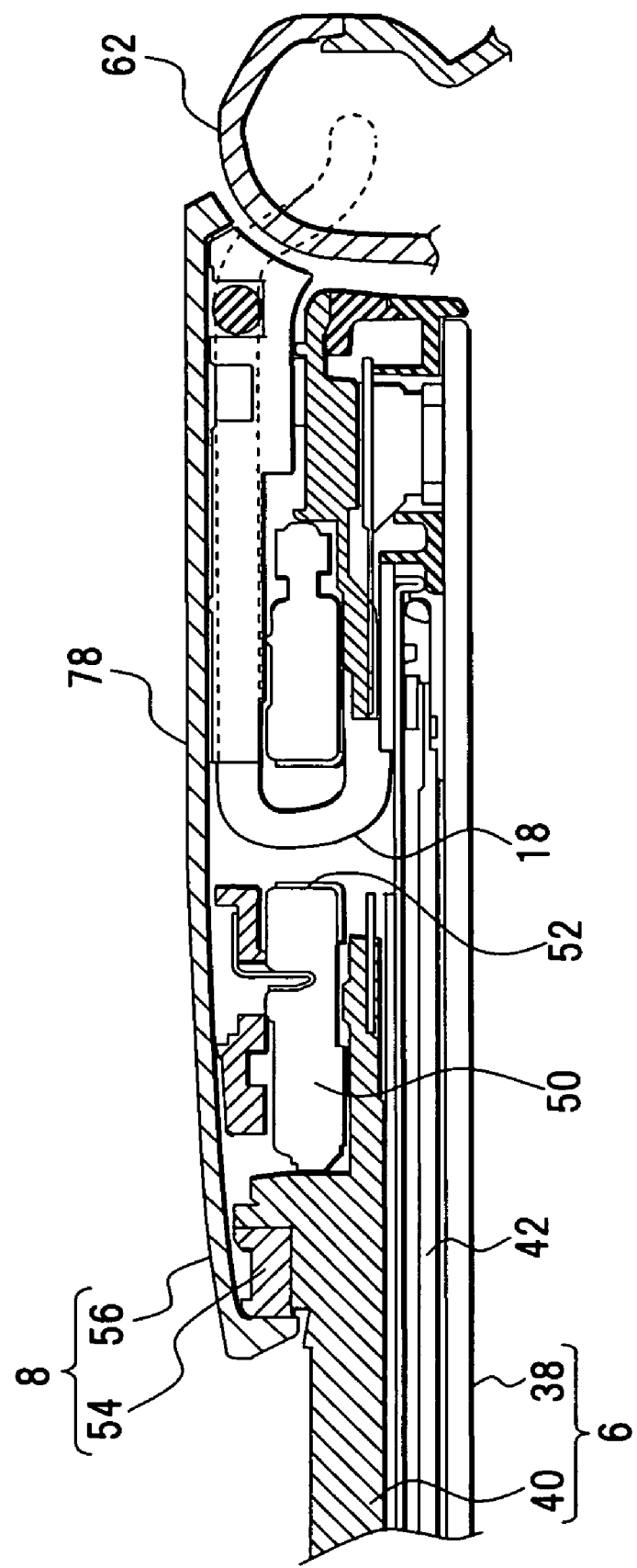
FIG. 12 is a sectional view of a cable passage structure across the movable arm and the movable side case.

The housing structure of the cable 18 will then be described with reference to FIGS. 10, 11, 12. FIG. 10 is a top view of the arm 54 of the movable arm 8 and the cable housing structure, FIG. 11 is a top view of the extracted cable housing unit 74, and FIG. 12 is a sectional view of a passage structure for the cable 18 across the movable arm 8 and the movable side case 6. In FIGS. 10 to 12, the same components as described in FIG. 8 are denoted by the same reference numerals.

The cable housing unit 74 is formed on the arm 54 of the movable arm 8 to be integral to the arm 54 through, for example, synthetic resin molding. In the cable housing unit 74, the extra length portion 76 of the cable 18 is placed in a sinuous form and is allowed to shift. To that end, the cable housing unit 74 has a bearing portion 88 that bears the cable 18 and its extra length portion 76 placed sinuously on the bearing portion 88, and standing walls 90, 92 that arrange the cable 18 sinuously on the bearing portion 88. The intermediate part of the cable housing unit 74 is provided with expanding portions 94, 96, which are formed on one or two or more spots to vary the gap between the standing walls 90, 92 so that the cable 18 is allowed to shift widthwise, and with a holding portion 98, which is formed by reducing the gap between the standing wall portions 90, 92 to hold the cable 18. The cable housing unit 74 also has a bent guide portion 100 that bends the extra length portion 76 of the cable 18 at 90 degrees or less, and bent guide portions 102, 104, 106 that bend the extra length portion 76 at 90 degrees or more into an arc.

The above configuration is depicted in a detailed form in FIG. 11. As shown in FIG. 11, the cable housing unit 74 starts from a linear portion 108 leading the cable 18 coming out of the cutout 70 of the bearing portion 62 toward the rotary module 50, and then extends through a bend 110 having a small radius of curvature, a liner portion 112, a bend 114, a liner portion 116, a bend 118, a liner portion 120, a bend 122, an expanding portion 124, and a round portion 126 to reach the cable insertion hole 52. At the expanding portion 124, which is formed near the opening of the cable insertion hole 52, that is, a point leading to the round portion 126, the gap between the standing walls 90, 92 is expanded in line with the inner diameter of the cable insertion hole 52 so that the expanding portion 124 allows the cable 18 to shift widthwise. The round portion 126 is formed along the circumference of the cable insertion hole 52. The standing walls 90, 92 cowork with the arm cover 56 to restrict the cable 18 to the cable bearing portion 88 of the cable housing unit 74, thus preventing the cable 18 from slipping off the cable housing unit 74.

Thus, the extra length portion 76 of the cable 18, the extra length portion 76 having the length necessary and sufficient for assembling the cellular phone terminal device 2 and for dispersing a stress from the movable units, is arranged sinuously without excessive bending in a plane defined by a gap d between the cutout 70 of the bearing portion 62 and the cable insertion hole 52 and by an available width w given by the arm 54 of the movable arm 8. This arrangement is made relative to the one-line distance L between the cutout 70 of the bearing portion 62 and the cable insertion hole 52.

The cable 18 housed in and lead along the cable housing unit 74, as shown in FIG. 12, is inserted through the cable insertion hole 52 of the rotary module 50, and is lead to the movable side case 6 in wiring arrangement.

Figure 13:
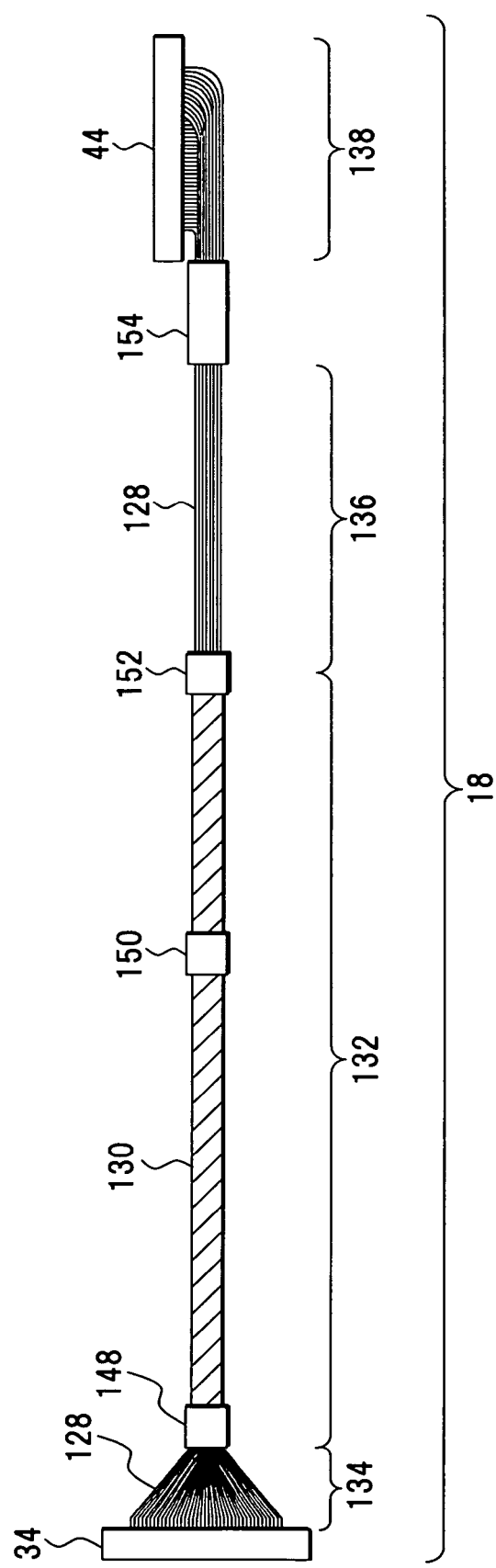
FIG. 13 depicts the cable.
Figure 14:
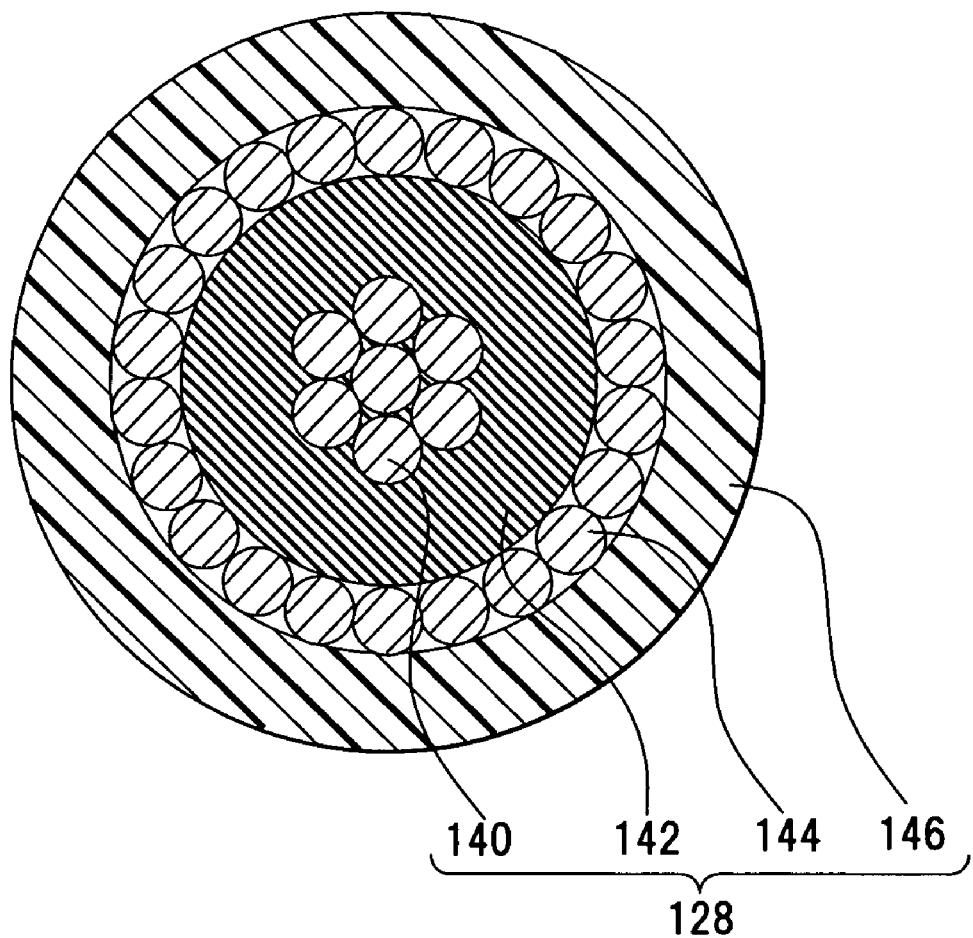
FIG. 14 is a sectional view of a thin coaxial cable.

The cable 18 will then be described with reference to FIGS. 13, 14. FIG. 13 depicts the cable 18, and FIG. 14 is a sectional view of a thin coaxial cable used as the cable 18.

The cable 18 is a bundle of, for example, dozens of thin coaxial cables 128, and has a sheathed portion 132 sheathed with a protective sheathing 130 and cable exposed portions 134, 136, 138 not sheathed with the protective sheathing 130. As shown in FIG. 14, each thin coaxial cable 128 is composed of a plurality of inner conductors 140, a plurality of outer conductors 144 disposed around the inner conductors 140 via an insulator 142, and an outer sheathing 146 disposed along the circumferential surfaces of the outer conductors 144.

The connector 34 is connected to one end of the cable 18, and the connector 44 is connected to the other end of the cable 18. The cable exposed portion 134, which is not sheathed with the highly slidable protective sheathing 130, is formed in the vicinity of the connected part of the connector 34, from which the thin coaxial cables 128 connected to the connector 34 is sheathed with the protective sheathing 130, and is bound with a binding unit 148. The protective sheathing 130 is secured with binding units 150, 152, while the middle part between the cable exposed portions 136, 138 is bound with a binding unit 154. The protective sheathing 130 is formed by spirally winding a slidable synthetic resin tape to have a winding start portion, a winding intermediate portion, and a winding end portion, which are provided with binding units 148, 150, and 152, respectively. A binding tape made of a slidable synthetic resin tape is wound around each of the binding units 148, 150, 152, 154 to prevent unwinding of the protective sheathing 130.

These highly slidable protective sheathing 130 and the binding units 148, 150, 152, 154 bind the thin coaxial cables 128 together while maintaining the slidability between the protective sheathing 130 and binding units 148, 150, 152, 154 and the thin coaxial cables 128. This allows the thin coaxial cables 128 to move in response to a stress acting on the cable 18.

A manufacturing method for the cellular phone terminal device 2 will then be described with reference to FIGS. 8, 9, 10, 12, 13, 15. FIG. 15 depicts protection for a connector of the cable 18.

The manufacturing method for the cellular phone terminal device 2 includes the following manufacturing processes for the cellular phone terminal device 2 and wiring processes for the cable 18.

(1) Process of Connecting Cable 18 and Fixed Side Substrate 32

The connector 34 of the cable 18 is joined to the connector unit 36 of the fixed side substrate 32 to connect the cable 18 to the fixed side substrate 32.

(2) Process of Joining Movable Arm 8 and Movable Side Case 6

The rotary module 50 is interposed between the movable arm 8 and the movable rear case 40 of the movable side case 6. The movable arm 8, rotary module 50, and movable side rear case 40 are then fixed together with the screws 58 at a plurality of spots to join the movable arm 8 to the movable side case 6. The movable side case 6 is thus constructed to be capable of rotating via the rotary module 50.

(3) Process of Connecting Fixed Side Front Case 20 and Movable Arm 8

The bearing portion 26 of the fixed side front case 20 is aligned with the bearing portions 60, 62 of the movable arm 8. The hinge module 66 is then fitted into the bearing portions 60, and into the bearing portions 62 to connect the fixed side front case 20 to the movable arm 8.

(4) Process of Leading Cable 18

Figure 15A:
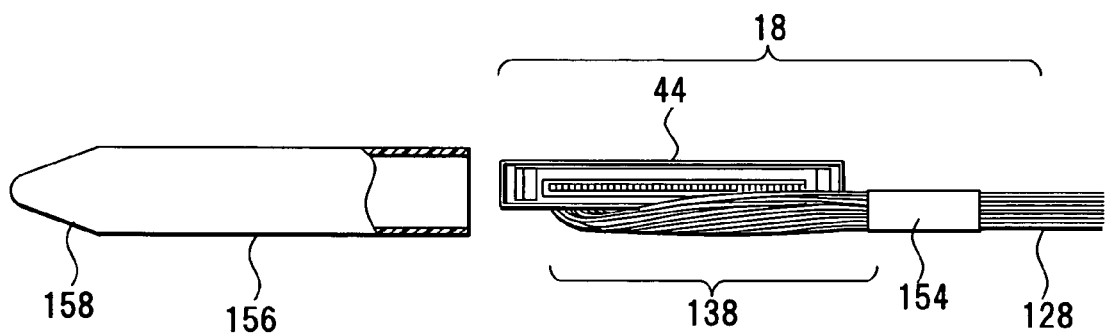
FIG. 15A depicts a protective cap and an end of the cable.

In carrying out cable wiring, the connecter 44 of cable 18 that is manipulated for wiring is capped with a protective cap 156 protecting a part of the cable 18 and the connector 44, as shown in FIG. 15A. The protective cap 156 is a tube that is put over a part of the cable 18 and the connector 44 to be held there. The protective cap 156 closes one end of the cable 18, and has a conical portion 158 at the front extremity of the cap 156.

Figure 15B:
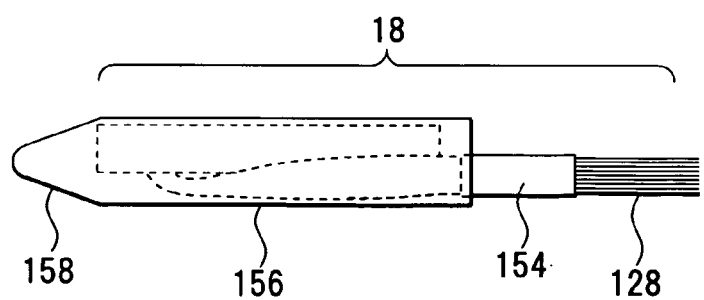
FIG. 15B depicts the cable fitted with the protective cap.

After the protective cap 156 has been fitted on the connector 44 of the cable 18, as shown in FIG. 15B, the connector 44 of the cable 18 is inserted into the cable insertion portion 30 on the bearing portion 26 of the fixed side front case 20, and is put through the through-hole 28 and the bearing portion 62 of the movable arm 8, then is further put through the cable insertion hole 52 of the rotary module 50. In this manipulation, the extra length portion 76 is kept out of the cable housing unit 74.

(5) Process of Connecting Cable 18 and Movable Side Substrate 42

The cable 18 is lead through the cable insertion hole 52 to the movable side substrate 42 of the movable side case 6, where the protective cap 156 is removed from the connector 44 of the cable 18. The connector 44 stripped of the cap 156 is then joined to the connector unit 46 of the movable side substrate 42 to connect the cable 18 to the movable side substrate 42. As a result, the fixed side substrate 32 is connected to the movable side substrate 42 via the cable 18, which passes through two movable units, i.e., the hinge mechanism 10 and the rotation mechanism 12, in wiring arrangement.

(6) Process of Housing Cable

The extra length portion 76 of the cable 18 is arranged in adjustment to the arm 54 of the movable arm 8, and is housed in the cable housing unit 74.

(7) Process of Restricting Cable 18 to Arm 54

The cable guide 68 is fitted to the bearing portion 62 of the movable arm 8 to hold the cable 18, and the arm cover 56 is fitted on the arm 54 to restrict the cable 18 and its extra length portion 76 housed in the cable housing unit 74.

Through the above procedure, the cellular phone terminal device 2 is assembled, and is wired with the cable 18, whose extra length portion 76 is housed in the cable housing unit 74.

The following is listed features and advantages of the cellular phone terminal device 2, cable wiring structure, and manufacturing method for the cellular phone terminal device 2 according to the present embodiment.

(a) In assembling the cellular phone terminal device 2, the connectors 34, 44 of the cable 18 are connected to the connectors 36, 46 of the substrates 32, 42. For this arrangement, the cable 18 needs a sufficient length. Arranging the connector on the side of the display unit 16 increases the size of the device, thus increases the size of the movable side substrate 42, which requires the cable 18 having a sufficient length to correspond to a size increase. The extra length portion 76 is, therefore, provided to give the cable 18 a sufficient length, and the cable housing unit 74 for housing the extra length portion 76 is formed on the movable arm 8 between the hinge mechanism 10 and the rotation mechanism 12. As a result, the extra length portion 76 of a sufficient length is housed in the cable housing unit 74. After connection of the connectors 33, 34, the extra length portion 76 only can be housed in the cable housing unit 74 without applying a force to the connecting part of the connectors 34, 44.

(b) Having a sinuous housing space, the cable housing unit 74 can house the extra length portion 76 of a sufficient length. The cable housing unit 74 is, therefore, capable of absorbing the extra length of the cable, improving the assembling performance of the cellular phone terminal device 2. The cable housing unit 74 is provided by utilizing a back space of the movable arm 8, which contributes to a reduction in the size of the cellular phone terminal device 2.

(c) The cable housing unit 74 is arranged between the hinge mechanism 10 and the rotary module 50, where the extra length portion 76 of the cable 18 put through each movable unit is housed in the cable housing unit 74. As a result, load resulting from opening/closing of the hinge mechanism 10 and from the rotation of the rotary module 50 does not concentrate on the cable 18 but is dispersed as the extra length portion 76 necessary for wiring enhances the durability of the cable 18. Thus, a proper extra length of the cable 18 is ensured near the connectors 34, 44, which contributes to an improvement in the durability of the cable 18.

(d) When a stress resulting from opening/closing or rotation operation acts on the cable 18, the cable housing unit 74 allows the cable 18 to shift in response to the stress. This prevents the wear of the cable 18, improves the durability of the cable 18, and suppresses unevenness in durability among products.

(e) In housing the extra length portion 76 in the cable housing unit 74, the extra length portion 76 is provided with spots where the cable 18 is bent at 90 degrees or more. According to the present embodiment, the spot is formed on the opening/closing side and on the rotation side, numbering in two. Forming the bends 84, 86 at the spots enables avoidance of an excessive stress acting on the cable 18, thus improves the durability of the cable 18.

(f) The extra length portion 76 housed in the cable housing unit 74 of the movable arm 8 is bound with the protective sheathing 130, and binding units 148, 150, 152, 158. This makes wiring work with the cable 18 more efficient, and improves the assembling performance of the cellular phone terminal device 2.

(g) The part of the cable 18 that passes through the cable insertion hole 52 of the rotary module 50 is the exposed portion 136 (so-called loose wire) of the thin coaxial cables 128. This enables avoidance of stress concentration on the cable 18, improving the durability of the cable 18. When the rotation angle of the rotary module 50 is large to reach 180 degrees, particularly, the exposed portion 136 protects the cable 18 from a stress caused by the rotation, contributing to an improvement in the durability of the cable.

(h) On the cable housing unit 74, the expanding portion 124 is formed on the entrance to the cable insertion hole 52 of the rotary module 50 fixed to the movable arm 8. The expanding portion 124 gives the cable 18 a higher degree of freedom, for example, releasing the cable 18 from a torsional force caused by rotation to reduce a torsion angle, thus improves the durability of the cable 18.

Second Embodiment

Figure 16:
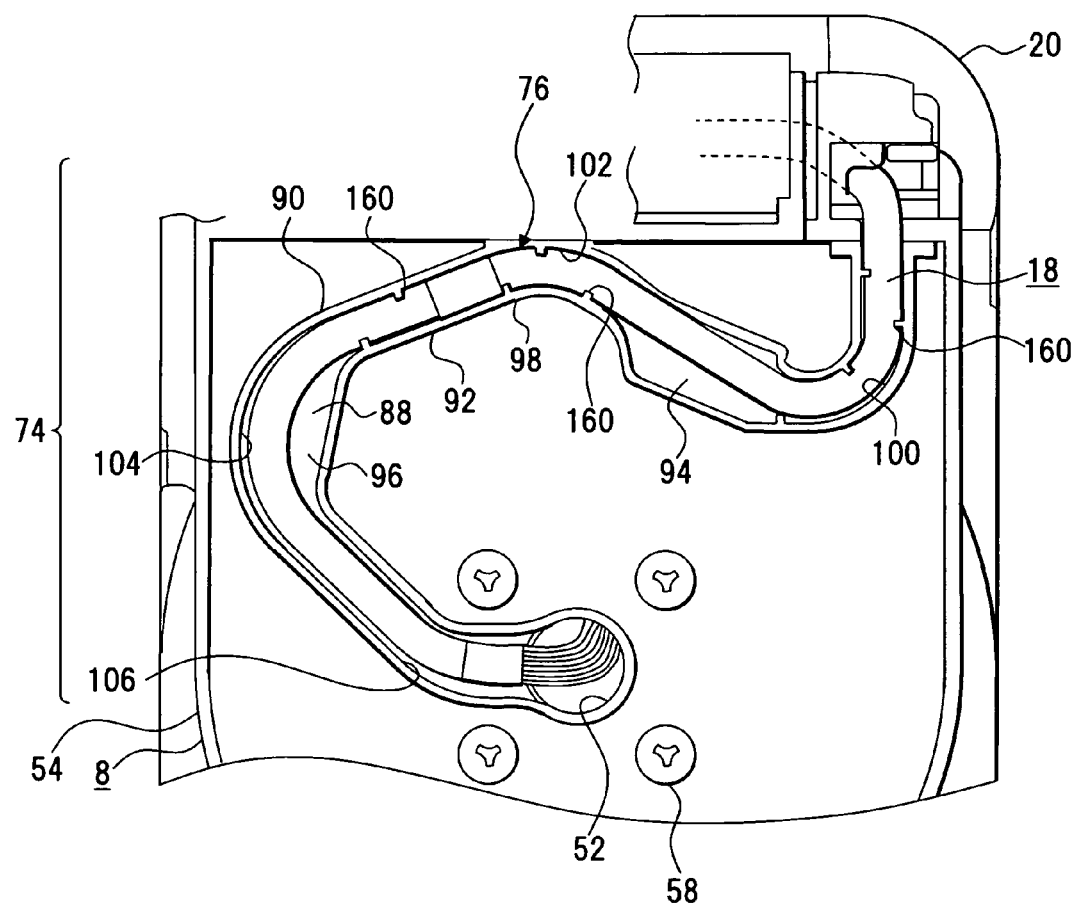
FIG. 16 depicts a cable housing structure according to a second embodiment.

A second embodiment of the present invention will be described with reference to FIG. 16. FIG. 16 is a top view of a cable housing structure on the arm 54 of the movable arm 8. In FIG. 16, the same components as described in FIG. 10 are denoted by the same reference numerals.

According to the second embodiment, a plurality of protrusions 160, such as ribs, are formed on the counter faces of the standing walls 90, 92 of the cable housing unit 74, and the cable 18 is held in each gap between the protrusions 160. The protrusions 160 may be formed at the same counter positions on the counter faces of the standing walls 90, 92, or may be formed at different positions in zigzag arrangement. Holding the cable 18 in the gaps between the protrusions 160 prevents the cable 18 from floating upon assembling, thus improves work efficiency.

Besides being held between such protrusions 160, the cable 18 may be sandwiched and held between the bearing portion 88 of the cable housing unit 74 and the arm cover 56 by covering the arm 54 of the movable arm 8 with the arm cover 56.

After being placed in the cable housing unit 74, the cable 18 may be fastened to the cable housing unit 74 with an adhesive tape. Pressing the cable 18 together, etc. while taping makes cable housing more effective.

Third Embodiment

Figure 17:
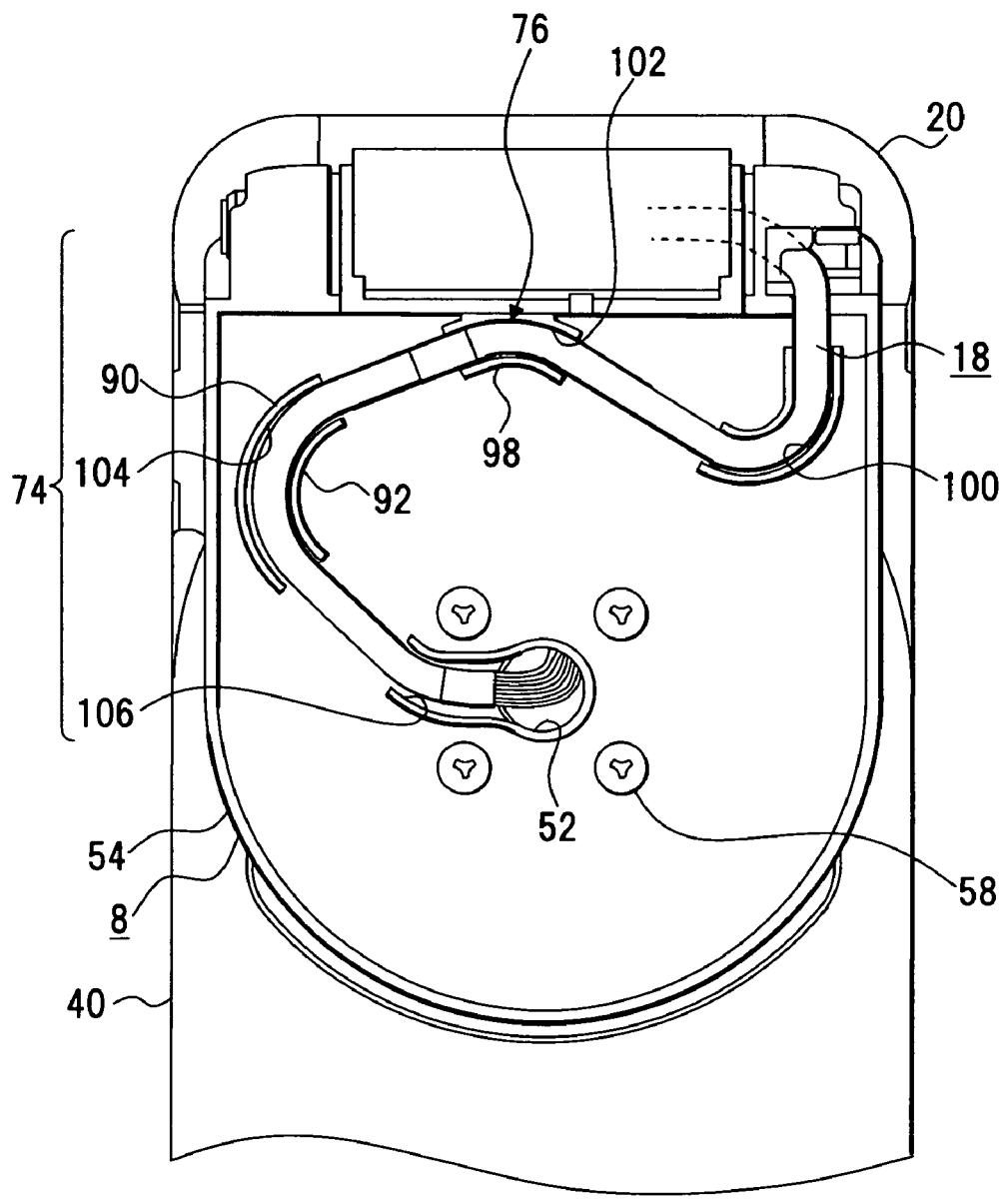
FIG. 17 depicts a cable housing structure according to a third embodiment.

A third embodiment of the present invention will be described with reference to FIG. 17. FIG. 17 is a top view of a cable housing structure on the arm 54 of the movable arm 8. In FIG. 17, the same components as described in FIG. 10 are denoted by the same reference numerals.

According to the above embodiments, the cable hosing unit 74 has the continuous standing walls 90, 92. In contrast, as shown in FIG. 17, a plurality of uncontinuous standing walls 90, 92 may be formed at the bends of the cable housing unit 74, and the cable 18 is housed in such a cable housing unit 74. This configuration allows the cable 18 to shift in response to a stress acting on the cable 18.

Fourth Embodiment

Figure 18:
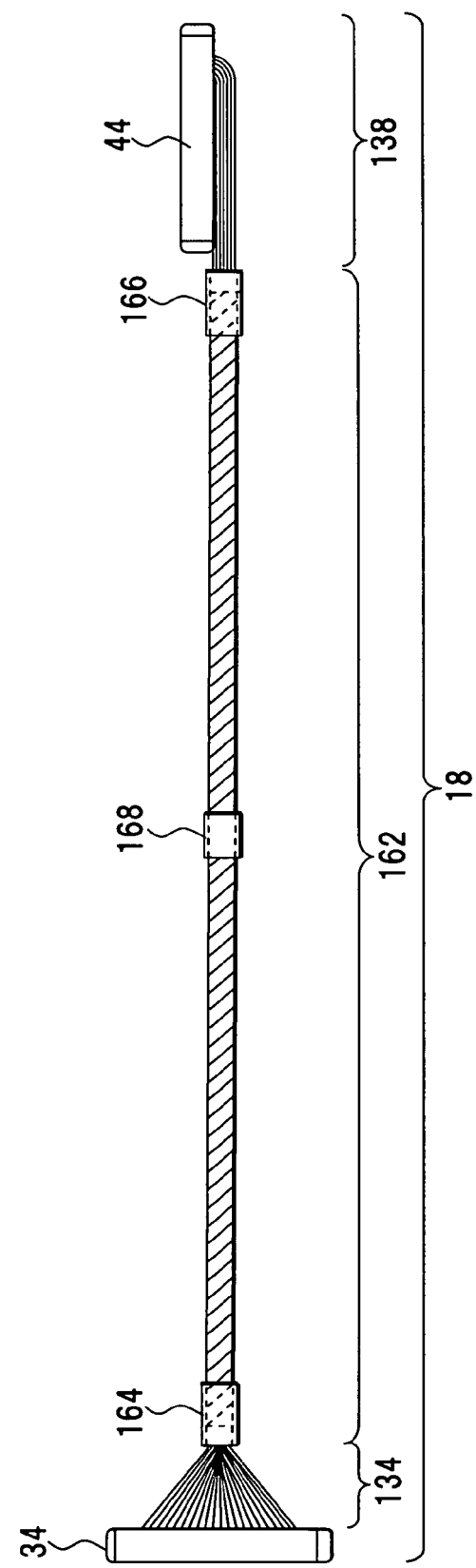
FIG. 18 depicts a cable according to a fourth embodiment.

A fourth embodiment of the present invention will be described with reference to FIG. 18. FIG. 18 depicts the cable 18. In FIG. 18, the same components as described in FIG. 13 are denoted by the same reference numerals.

According to the cable 18 of the fourth embodiment, the exposed portions 134, 138 are formed near the connectors 34, 44 attached to the ends of the cable 18. The part of the cable 18 other than the exposed portions is made into a sheathed portion 162, whose ends are bound with binding units 164, 166 and middle part is bound with a binding unit 168. The most part of the cable 18 is thus sheathed, and yet the cable 18 offers the same effect as described above.

Figure 19:
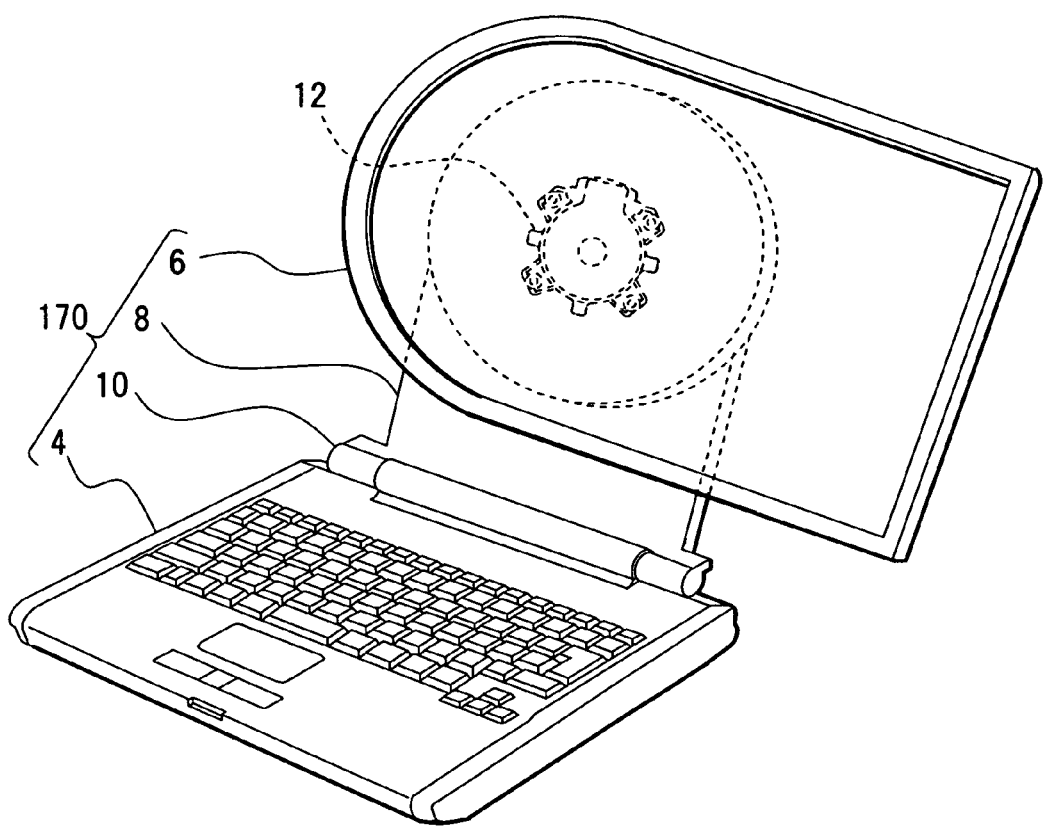
FIG. 19 depicts a personal computer according to another embodiment.
Figure 20:
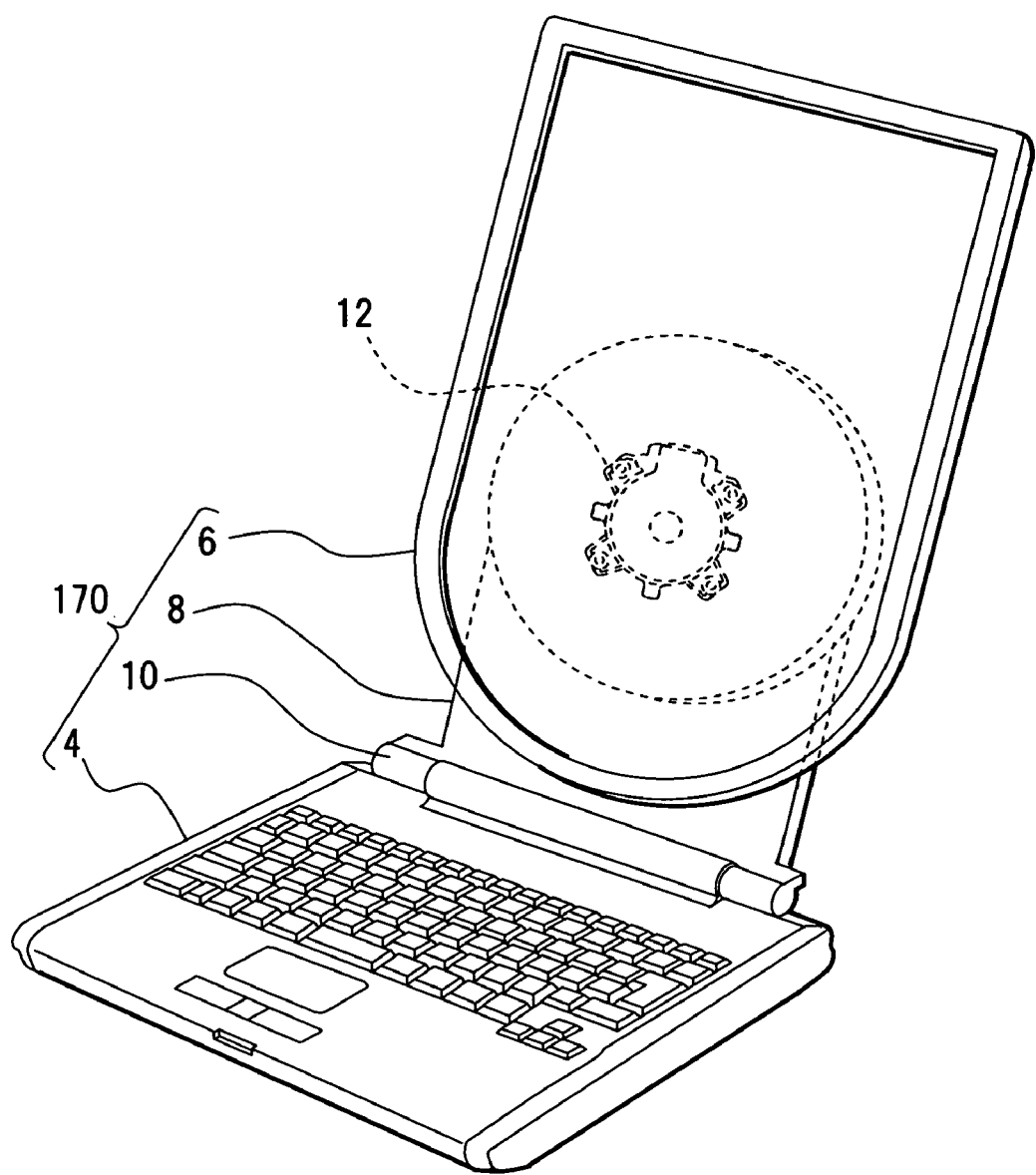
FIG. 20 depicts a personal computer according to still another embodiment.

Other Embodiments (1) While the cellular phone terminal device 2 is described as an example of an electronic apparatus in the above embodiments, the present invention can also apply to a personal computer (PC) 170, as shown in FIGS. 19, 20. In FIGS. 19, 20, the same components as described in FIGS. 1 to 8 are denoted by the same reference numerals. In this application to the PC 170, the movable side case 6 can be arranged in a laterally elongated position to the fixed side case 4 (FIG. 19), or in a vertically elongated position to the fixed side case 4 (FIG. 20). This configuration is the same as that of the cellular phone terminal device 2 in the point that the cable 18 is arranged in wiring via the two movable units of hinge mechanism 10 and rotation mechanism 12. This configuration offers the same effect as described above.

(2) While the cellular phone terminal device 2 and the PC 170 are described as examples of an electronic apparatus in the above embodiments, the present invention can also apply to a remote controller, game equipment, etc., which has a movable unit.

(3) In the above embodiments, the opening/closing unit, i.e., hinge mechanism 10 is described as the first movable unit, and the rotary unit, i.e., the rotation mechanism 12 is described as the second movable unit. The invention, however, also offers a configuration including a single or two or more movable units, or a configuration including movable units consisting of the hinge mechanisms or of the rotation mechanisms.

While the most preferred embodiments of the present invention have been described, the description is not intended to limit the present invention. Various modifications and revisions of the embodiments can be made by those skilled in the techniques in accordance with the points and gist of the invention that are described in the claims or disclosed in the specification. These modifications and revisions surely fall within the true scope of the present invention.

As described heretofore, the present invention relates to an electronic apparatus, such as cellular phone terminal device, that has a movable unit such as an opening/closing unit and a rotary unit, and to cable wiring on the electronic apparatus. The invention is so useful that offers advantages of suppressing the wear of a cable due to operation for such a move as opening/closing and rotation, facilitating cable wiring, contributing to improved assembling performance of the electronic apparatus, improving the durability of the cable, suppressing the unevenness of the durability, etc.

What is claimed is:

1. An electronic apparatus, comprising:
a first case;
a movable arm; and
a second case,
wherein the first case and the movable arm are fitted openably and closably via a first movable unit, and the movable arm and the second case are fitted rotatably via a second movable unit, and
wherein the movable arm includes a cable housing unit that houses a cable connecting the first case and the second case sinuously.

2. The electronic apparatus of claim 1, wherein the first movable unit has a through portion through which the cable is passed.

3. The electronic apparatus of claim 1, wherein the second movable unit has a through portion through which the cable is passed.

4. The electronic apparatus of claim 1, wherein the cable housing unit has either or both of bent guide portions, one guide portion bending the cable at 90 degrees or less, and the other guide portion bending the cable at 90 degrees or more into an arc.

5. The electronic apparatus of claim 1, wherein the cable housing unit has an expanding portion that allows the cable to shift widthwise.

6. The electronic apparatus of claim 1, wherein the cable housing unit has a holding portion that prevents the cable from shifting longitudinally.

7. The electronic apparatus of claim 1, wherein the cable housing unit comprises:
a bearing portion that bears the cable placed thereon sinuously; and
standing walls that arranges the cable on the bearing portion sinuously.

8. The electronic apparatus of claim 1, further comprising:
a protective sheathing that sheathes a part or the whole of the cable.

9. The electronic apparatus of claim 8, wherein the protective sheathing is a resin belt wound spirally.

10. The electronic apparatus of claim 8, wherein the cable has a part exposed from the protective sheathing, the exposed part being a part passing through the first movable unit or the second movable unit, or being near the part passing through the first movable unit or the second movable unit.

* * * * *